United States Patent
Zeng et al.

(10) Patent No.: US 8,537,725 B1
(45) Date of Patent: Sep. 17, 2013

(54) METHOD AND APPARATUS FOR REBALANCING THE SIZES OF THE DOWNLINK (DL) ASSOCIATION SETS FOR COMPONENT CARRIERS HAVING DIFFERENT TIME DIVISION DUPLEX SUBFRAME CONFIGURATIONS

(71) Applicant: Renesas Mobile Corporation, Tokyo (JP)

(72) Inventors: Erlin Zeng, Beijing (CN); Jing Han, Beijing (CN); Wei Bai, Beijing (CN); Chunyan Gao, Beijing (CN); Haiming Wang, Beijing (CN); Na Wei, Beijing (CN)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/855,232

(22) Filed: Apr. 2, 2013

Related U.S. Application Data (63) Continuation of application No. PCT/CN2011/073529, filed on Apr. 29, 2011.

(51) Int. Cl.
*H04J 3/00* (2006.01)
*H04B 7/212* (2006.01)

(52) U.S. Cl.
USPC ............................ 370/280; 370/236; 370/337

(58) Field of Classification Search
USPC .................................. 370/280, 236, 337, 468
See application file for complete search history.

(56) References Cited

U.S. PATENT DOCUMENTS

| | | | |
|---|---|---|---|
| 2010/0172290 A1* | 7/2010 | Nam et al. | 370/328 |
| 2010/0329194 A1* | 12/2010 | Shen et al. | 370/329 |
| 2011/0200016 A1* | 8/2011 | Bergman et al. | 370/335 |
| 2011/0228863 A1* | 9/2011 | Papasakellariou et al. | 375/259 |
| 2011/0269490 A1* | 11/2011 | Earnshaw et al. | 455/509 |
| 2012/0082145 A1* | 4/2012 | Chen et al. | 370/338 |

FOREIGN PATENT DOCUMENTS

| | | |
|---|---|---|
| CN | 1511389 A | 7/2004 |
| WO | WO 2011/047196 A1 | 4/2011 |

OTHER PUBLICATIONS

PCT International Search Report and Written Opinion mailed Feb. 9, 2013 which is issued in a related PCT Application No. PCT/CN2011/073529 (7 pages).

* cited by examiner

*Primary Examiner* — Brian D Nguyen
(74) *Attorney, Agent, or Firm* — Lucas & Mercanti LLP; Robert P. Michal (57) ABSTRACT

Methods, apparatus and computer program products are provided for rebalancing the sizes of downlink (DL) association sets for component carriers having different time division duplex subframe configurations. A method is provided that includes determining DL subframes that are included in a DL association set for each of a plurality of component carriers. In an instance in which the number of acknowledgement (ACK)/negative acknowledgement (NACK) bits corresponding to the DL subframes included in the DL association sets for respective component carriers differ by at least a predetermined amount, the method modifies the number of ACK/NACK bits corresponding to the DL subframes that are included in the DL association sets for each of the respective component carriers. The method may also cause transmission of the ACK/NACK bits in accordance with the DL association sets, as modified, via the respective component carriers. Corresponding apparatus and computer program products are also provided.

26 Claims, 6 Drawing Sheets

METHOD AND APPARATUS FOR REBALANCING THE SIZES OF THE DOWNLINK (DL) ASSOCIATION SETS FOR COMPONENT CARRIERS HAVING DIFFERENT TIME DIVISION DUPLEX SUBFRAME CONFIGURATIONS

CROSS REFERENCE TO RELATED APPLICATION

This application is a Continuation of PCT International Patent Application No. PCT/CN2011/073529 filed on Apr. 29, 2011, the entire content of which is incorporated herein by reference.

TECHNOLOGICAL FIELD

Embodiments of the present invention relate generally to communications technology and, more particularly, to methods and apparatus for rebalancing the sizes of the downlink (DL) association sets for a plurality of component carriers having different time division duplex (TDD) uplink (UL)/downlink (DL) subframe configurations.

BACKGROUND

Carrier aggregation is a combination of two or more cells or component carriers (CCs) operating at different frequencies in order to provide a broader transmission bandwidth for a mobile terminal. Depending upon its capabilities, a mobile terminal may simultaneously receive or transmit on one or more of the cells. The cells aggregated in accordance with carrier aggregation include a primary cell and one or more secondary cells. The primary cell is the component carrier that: (i) operates on a primary carrier in which the mobile terminal either performs the initial connection establishment procedure or initiates the connection re-establishment procedure, or (ii) was indicated as the primary cell in a handover procedure. Conversely, a secondary cell is a component carrier, operating on a secondary carrier, which may be configured once radio resource control (RRC) is established and which may be used to provide additional radio resources.

Although the focus to date has been principally upon frequency division duplex (FDD) networks, TDD networks that support carrier aggregation must also be considered. Indeed, in a TDD network, the primary cell and the secondary cells may have respective TDD UL/DL subframe configurations. In Long Term Evolution (LTE) release 10, mobile terminals that support TDD signaling are required to operate in accordance with a TDD UL/DL subframe configuration that is aligned and consistent across the primary and secondary cells that are to be aggregated. Additionally, LTE release 10 required that common discontinuous reception (DRX) parameters be utilized for each of the primary and secondary cells such that the active time and the DRX pattern would be the same for each of the aggregated cells.

For mobile terminals configured in accordance with LIE release 11, however, the primary and secondary cells are permitted to have different TDD UL/DL subframe configurations. In this regard, primary and secondary cells having different TDD UL/DL subframe configurations may provide different amounts of resources and a different DL/UL ratio for the mobile terminal. For example, the use of different TDD UL/DL subframe configurations by the primary and secondary cells in LTE release 11 may permit different ones of the cells to provide different coverage by, for example, enabling more UL subframes in a lower frequency cell to enlarge the coverage. The different TDD UL/DL subframe configurations may also support inter-band carrier aggregation and co-existence with other systems and certain frequency bands. The ability to provide different amounts of resources and a different DL/UL ratio may be of particular importance to a mobile terminal that utilizes carrier aggregation since carrier aggregation is oftentimes utilized in an instance in which the mobile terminal has a relatively large amount of data to transmit, thereby increasing the importance of defining the TDD UL/DL subframe configurations of the primary and secondary cells so as to provide a suitable DL/UL ratio and to otherwise efficiently utilize the communication resources.

By allowing the primary and secondary cells to have different TDD UL/DL subframe configurations, however, the different TDD UL/DL subframe configurations of the primary and secondary cells may have overlapped subframes in some instances, such as by one of the cells having a DL subframe at a specific instance in time while another cell has an UL subframe. In order to avoid missing any transmission and reception opportunities, a mobile terminal may be configured to provide for simultaneous reception and transmission so as to accommodate overlapping subframes.

Figure 1:
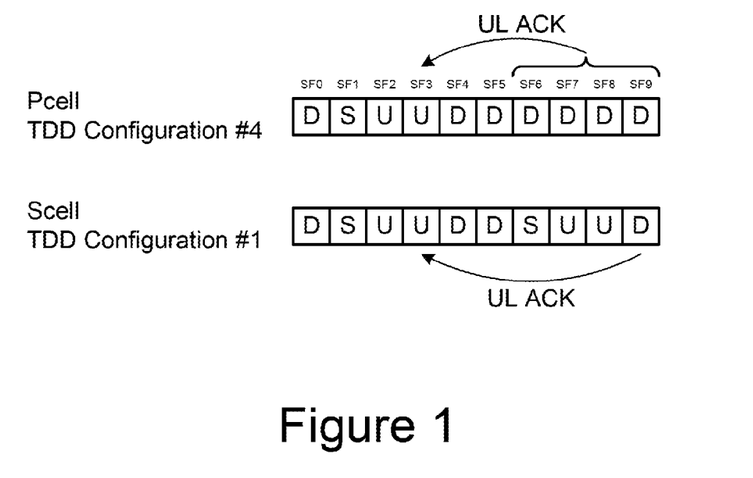
FIG. 1 illustrates the TDD UL/DL subframe configurations of a primary cell and a secondary cell having different DL association set sizes.

The TDD UL/DL subframe configuration of a cell normally defines its hybrid automatic repeat request (HARQ) timing and reception. For example, FIG. 1 illustrates a primary cell having TDD configuration #4 and a secondary cell having TDD configuration #2. The uplink ACK/(N ACK feedback may be provided by each of the primary and secondary cells based upon their respective configurations. In an instance in which the secondary cell supports a physical uplink control channel (PUCCH), uplink frame #8 of the secondary cell may support transmission of an ACK/NACK bit. Additionally, in downlink subframes #6, 7 and 8 of the primary cell, physical downlink shared channel (PDSCH) may be supported since simultaneous transmission and reception is allowed by the mobile terminal. Further, in uplink subframes #3 of the primary and secondary cells, the PUCCH may be from the primary cell.

By way of example, FIG. 1 illustrates a situation in which the primary and secondary cells are configured to have TDD UL/DL configurations #4 and #1 respectively. In accordance with the UL ACK/NACK timing specified by the LTE specification, a number of DL subframes require UL ACK/NACK feedback in UL subframe #3. Thus, the size of the DL association set for the primary cell may be four, that is, downlink subframes #6, 7, 8 and 9, and for the secondary cell may be one, that is, downlink subframe #9. Similarly, in an instance in which the downlink pilot time slot (DwPTS) does not support PDSCH transmissions, the size of the DL association set for UL subframe #2 would be 3 and 1 for the primary cell and the secondary cell, respectively. By having different numbers of downlink subframes that require UL ACK/NACK feedback in a respective UL subframe, the primary and secondary cells may be unbalanced.

In an instance in which a mobile terminal is configured to support PUCCH format 1$b$ with channel selection mode b, that is, the PUCCH mode with ACK/NACK time domain bundling, the ACK/NACK bits may be compressed by mapping the ACK/NACK bits to respective states. In this regard, Table 1 presented below defines the mapping between various combinations of four DL subframes, that is, a DL association set of size 4, and respective states. In this table, A represents ACK, N represents NACK, D represents discontinuous transmission (DTX) and "any" means that the states have to be reported to or by the mobile terminal regardless of whether the mobile terminal correctly received the corresponding state.

TABLE 1

| HARQ-ACK(0), HARQ-ACK(1), HARQ-ACK(2), HARQ-ACK(3) | Mapped state |
|---|---|
| 'D, any, any, any' or no DL assignment is received | D, D |
| 'A, D, D, D' | A, N |
| 'A, A, N/D, any' | N, A |
| 'A, A, A, N/D' | A, A |
| 'A, A, A, A' | A, N |
| 'N, any, any, any' or 'A, D/N, any, any except for A, D, D, D' | N, N |

As shown by the dashed blocks in Table 1, there will be DL throughput (TP) loss due to unnecessary retransmission for those states that correspond to DL subframes designated as "any" since an "any" subframe always results in retransmission for the PDSCH.

The unbalanced scenario depicted in FIG. 1 having component carrier-specific TDD configurations may be required to co-exist with time division synchronous code division multiple access (TD-SCDMA) in one of the bands. In this regard, the co-existence with TD-SCDMA will require TDD UL/DL configuration #1 or #2 in the relative frequency band. As shown in FIG. 1, the secondary cell has a TDD configuration #1, but the other component carrier, that is, the primary cell, is configured with a TDD UL/DL configuration #4 for supporting improved downlink throughput in the cell. As such, the scenario depicted by FIG. 1 may occur with some frequency. As an example, if the PDCCH/PDSCH decoding performance is independent among the DL subframes and the ACK probability of a PDSCH is around 0.1 while the PDCCH DRX probability is much lower, then the probability of the state "A, A, N/D, any" is about 8.1 percent and the probability of the state "N, any, any, any" is about 10 percent. Thus, the DL TP loss that results from the imbalance in the DL association set sizes of two cells may occur more frequently than desired.

BRIEF SUMMARY

Methods, apparatus and computer program products are provided according to an example embodiment for rebalancing the sizes of the downlink (DL) association sets for component carriers having different time division duplex subframe configurations. By rebalancing the sizes of the downlink (DL) association sets for component carriers having different TDD subframe configurations, the TP loss may be reduced as a result of a reduction in the number of retransmissions.

In one embodiment, a method is provided that includes determining DL subframes that are included in a DL association set for each of a plurality of component carriers, in an instance in which the number of acknowledgement (ACK)/ negative acknowledgement (NACK) bits corresponding to the DL subframes included in the DL association sets for respective component carriers differ by at least a predetermined amount, the method modifies the number of ACK/ NACK bits corresponding to the DL subframes that are included in the DL association set for each of the respective component carriers. The method may also cause transmission of ACK/NACK bits in accordance with the DL association sets, as modified, via the respective component carriers.

In another embodiment, an apparatus is provided that includes at least one processor and at least one memory including computer program code with the at least one memory and the computer program code being configured to, with the at least one processor, cause the apparatus at least to determine DL subframes that are included in a DL association set for each of a plurality of component carriers. In an instance in which the number of acknowledgement (ACK)/negative acknowledgement (NACK) bits corresponding to the DL subframes included in the DL association sets for respective component carriers differ by at least a predetermined amount, the at least one memory and the computer program code are configured to, with the at least one processor, cause the apparatus to modify the number of ACK/NACK bits corresponding to the DL subframes that are included in the DL association set for each of the respective component carriers. The at least one memory and the computer program code may also be configured to, with the at least one processor, cause the apparatus to cause transmission of ACK/NACK bits in accordance with the DL association sets, as modified, via the respective component carriers.

In a further embodiment, a computer program product is provided that includes at least one computer-readable storage medium having computer-executable program code instructions stored therein with the computer-executable program code instructions including program code instructions for determining DL subframes that are included in a DL association set for each of a plurality of component carriers. In an instance in which the number of acknowledgement (ACK)/ negative acknowledgement (NACK) bits corresponding to the DL subframes included in the DL association sets for respective component carriers differ by at least a predetermined amount, the computer-executable program code instructions include program code instructions for modifying the number of ACK/NACK bits corresponding to the DL subframes that are included in the DL association set for each of the respective component carriers. The computer-executable program code instructions may also include program code instructions for causing transmission of ACK/NACK bits in accordance with the DL association sets, as modified, via the respective component carriers.

In yet another embodiment, an apparatus is provided that includes means for determining DL subframes that are included in a DL association set for each of a plurality of component carriers. In an instance in which the number of acknowledgement (ACK)/negative acknowledgement (NACK) bits corresponding to the DL subframes included in the DL association set for respective component carriers differ by at least a predetermined amount, the apparatus also includes means for modifying the number of ACK/NACK bits corresponding to the DL subframes that are included in the DL association set for each of the respective component carriers. The apparatus may also include means for causing transmission of ACK/NACK bits in accordance with the DL association sets, as modified, via the respective component carriers.

In one embodiment, a method is provided that includes determining DL subframes that are included in a DL association set for each of a plurality of component carriers. In an instance in which the number of acknowledgement (ACK)/ negative acknowledgement (NACK) bits corresponding to the DL subframes included in the DL association set for respective component carriers differ by at least a predetermined amount, the method modifies the number of ACK/ NACK bits corresponding to the DL subframes that are included in the DL association set for each of the respective component carriers. The method may also receive signals via the respective component carriers including ACK NACK bits in accordance with the DL association sets, as modified.

In another embodiment, an apparatus is provided that includes at least one processor and at least one memory including computer program code with the at least one memory and the computer program code being configured to, with the at least one processor, cause the apparatus at least to determine DL subframes that are included in a DL association set for each of a plurality of component carriers. In an instance in which the number of acknowledgement (ACK)/negative acknowledgement (NACK) bits corresponding to the DL subframes included in the DL association set for respective component carriers differ by at least a predetermined amount, the at least one memory and the computer program code are configured to, with the at least one processor, cause the apparatus to modify the number of ACK/NACK bits corresponding to the DL subframes that are included in the DL association set for each of the respective component carriers. The at least one memory and the computer program code may also be configured to, with the at least one processor, cause the apparatus to receive signals via the respective component carriers including ACK/NACK bits in accordance with the DL association sets, as modified.

In a further embodiment, a computer program product is provided that includes at least one computer-readable storage medium having computer-executable program code instructions stored therein with the computer-executable program code instructions including program code instructions for determining DL subframes that are included in a DL association set for each of a plurality of component carriers. In an instance in which the number of acknowledgement (ACK)/negative acknowledgement (NACK) bits corresponding to the DL subframes included in the DL association sets for respective component carriers differ by at least a predetermined amount, the computer-executable program code instructions include program code instructions for modifying the number of ACK/NACK bits corresponding to the DL subframes that are included in the DL association set for each of the respective component carriers. The computer-executable program code instructions may also include program code instructions for receiving signals via the respective component carriers including ACK/NACK bits in accordance with the DL association sets, as modified.

In yet another embodiment, an apparatus is provided that includes means for determining DL subframes that are included in a DL association set for each of a plurality of component carriers. In an instance in which the number of acknowledgement (ACK)/negative acknowledgement (NACK) bits corresponding to the DL subframes included in the DL, association set for respective component carriers differ by at least a predetermined amount, the apparatus also includes means for modifying the number of ACK/NACK bits corresponding to the DL subframes that are included in the DL association set for each of the respective component carriers. The apparatus may also include means for receiving signals via the respective component carriers including ACK/NACK bits in accordance with the DL association sets, as modified.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE SEVERAL VIEWS OF THE DRAWINGS

Having thus described embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 2:
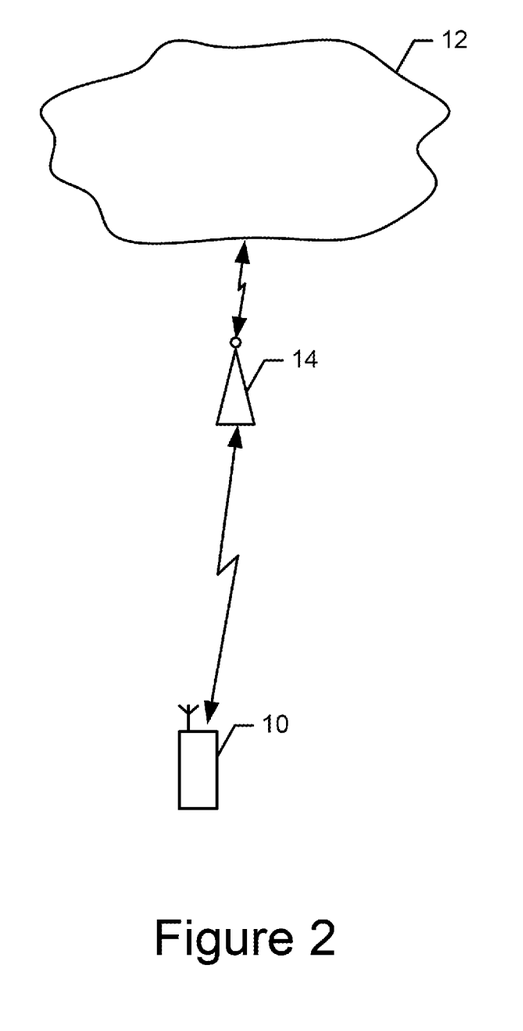
FIG. 2 illustrates a system including a mobile terminal and base station configured to support TDD signaling and carrier aggregation in accordance with one embodiment of the present invention.

A method, apparatus and computer program product are disclosed for modifying the number of ACK/NACK bits for a plurality of component carriers that have different TDD UL/DL subframe configurations. In this regard, the method, apparatus and computer program product of some example embodiments more closely balance the number of ACK/NACK bits corresponding to the DL subframes in the DL association sets for the plurality of component carriers, thereby reducing the TP loss by reducing the number retransmissions. Although the method, apparatus and computer program product may be implemented in a variety of different systems, one example of such a system is shown in FIG. 2, which includes a first communication device (e.g., mobile terminal 10) that is capable of communication with a network 12 (e.g., a core network) via a base station 14 (e.g., an evolved Node B (eNB)). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 12 may include a collection of various different nodes, devices or functions that may be in communication with each other via corresponding wired and/or wireless interfaces. For example, the network may include one or more base stations 14, such as one or more node Bs, eNBs, access points or the like, each of which may serve a coverage area divided into one or more cells. The base station or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network. In accordance with embodiments of the present invention, the network may be a TDD network.

A communication device, such as the mobile terminal 10 (also known as user equipment (UE)), may be in communication with other communication devices or other devices via the base station 14 and, in turn, the network 12. In instances in which the network is a TDD network, the mobile terminal may be configured to support communications in accordance with TDD. In some cases, the communication device may include an antenna for transmitting signals to and for receiving signals from a base station via a plurality of component carriers (CCs) including a primary cell (Pcell) and one or more secondary cells (Scell). As described below, each of the primary and secondary cells may have a TDD UL//DL subframe configuration that defines a predefined sequence of DL subframes, UL subframes and special (S) subframes to be exchanged between the mobile terminal and the network. The TDD UL/DL subframe configurations of the primary and secondary cells may be different such that there may be one or more overlapping subframes, In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 12.

Figure 3:
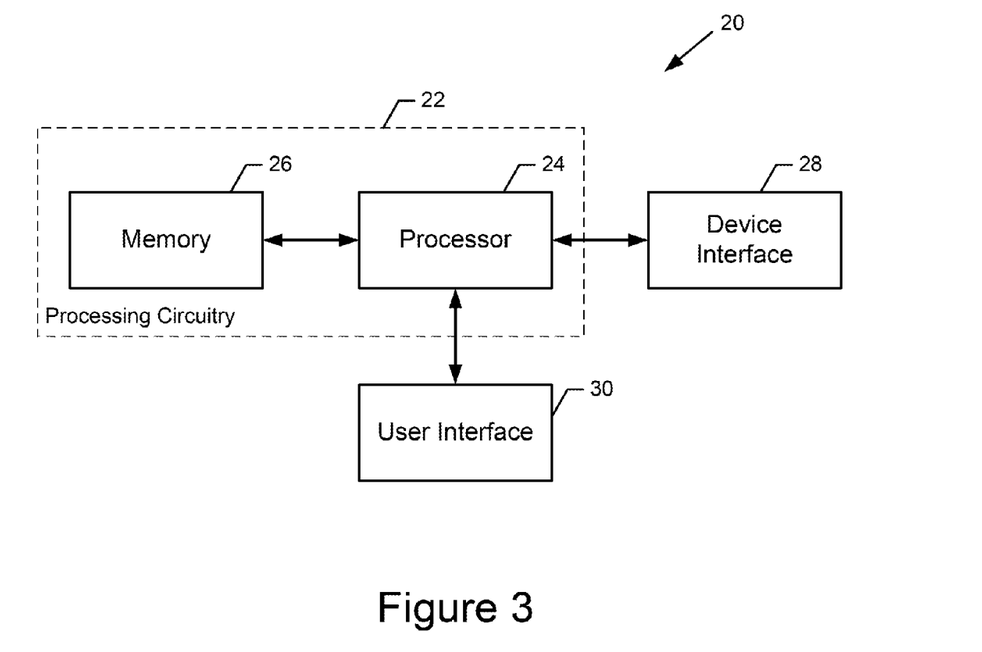
FIG. 3 is a block diagram of a mobile terminal in accordance with one embodiment of the present invention.

In one embodiment, for example, the mobile terminal 10 may be embodied as or otherwise include an apparatus 20 as generically represented by the block diagram of FIG. 3. In the context of a mobile terminal, the apparatus may be configured to modify the number of DL subframes in the DL association sets for a plurality of component carriers that have different TDD UL/DL subframe configurations, thereby permitting the number of DL subframes in the DL association sets to be more closely balanced. While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

Figure 4:
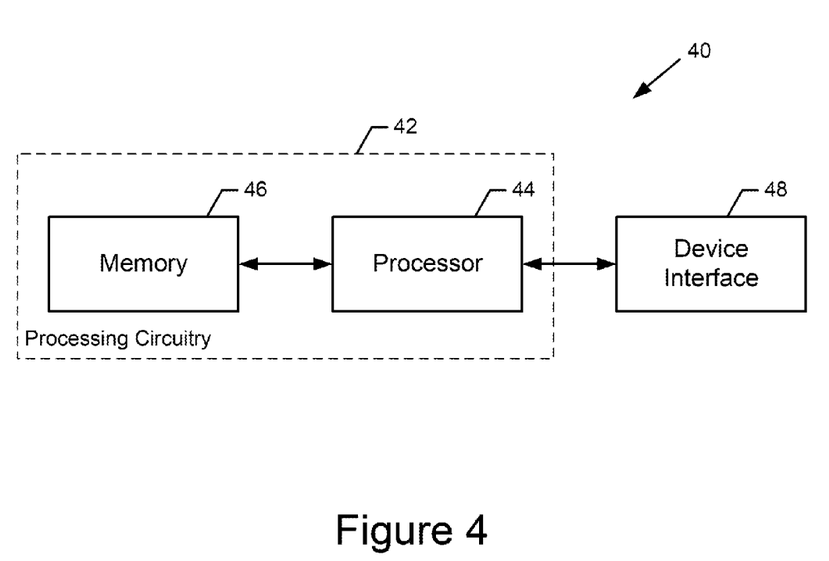
FIG. 4 is a block diagram of a base station in accordance with one embodiment of the present invention.

As shown in FIG. 4, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention, in some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 12 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions or execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, a base station 14 or other network entity may be configured to communicate with the mobile terminal 10. In instances in which the network 12 is a TDD network, the base station may be configured to support communications in accordance with TDD. In some cases, the base station may include an antenna for transmitting signals to and for receiving signals from the mobile terminal via a plurality of component carriers including a primary cell and one or more secondary cells. As noted above, each of the primary and secondary cells may have a TDD UL//DL subframe configuration that defines a predefined sequence of DL subframes. UL subframnes and special (S) subframes to be exchanged between the mobile terminal and the network. The base station of one embodiment may recognize that the number of ACK/NACK bits corresponding to the DL subframes in the DL association sets for a plurality of component carriers that have different TDD UL/DL subframe configurations have been modified in such a manner as to permit the number of ACK/NACK bits corresponding to the DL subframes in the DL association sets to be more closely balanced.

The base station 14 may include one or more processors that may define processing circuitry either alone or in combination with one or more memories. The processing circuitry may utilize instructions stored in the memory to cause the base station to operate in a particular way or execute specific functionality when the instructions are executed by the one or more processors. The base station may also include communication circuitry and corresponding hardware/software to enable communication with the mobile terminal 10 and/or the network 12.

In one embodiment, for example, the base station 14 may be embodied as or otherwise include an apparatus 40 as generically represented by the block diagram of FIG. 4. While the apparatus may be employed, for example, by a base station, it should be noted that the components, devices or elements described below may not be mandatory and thus some may be omitted in certain embodiments. Additionally, some embodiments may include further or different components, devices or elements beyond those shown and described herein.

As shown in FIG. 4, the apparatus 40 may include or otherwise be in communication with processing circuitry 42 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may include one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip" As such, in some cases, a chip or chipset may constitute means for performing one or more operations for providing the functionalities described herein.

In an example embodiment, the processing circuitry 42 may include a processor 44 and memory 46 that may be in communication with or otherwise control a device interface 48. As such, the processing circuitry may be embodied as a circuit chip (e.g., an integrated circuit chip) configured (e.g., with hardware, software or a combination of hardware and software) to perform operations described herein. However, in some embodiments taken in the context of the base station 14, the processing circuitry may be embodied as a portion of a base station or other network entity.

The device interface 48 may include one or more interface mechanisms for enabling communication with other devices and/or networks. In some cases, the device interface may be any means such as a device or circuitry embodied in either hardware, or a combination of hard ware and software that is configured to receive and/or transmit data from/to a network 12 and/or any other device or module in communication with the processing circuitry 42. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 46 may include one or more non-transitory memory devices such as, for example, volatile and/or non-volatile memory that may be either fixed or removable. The memory may be configured to store information, data, applications, instructions or the like for enabling the apparatus 40 to carry out various functions in accordance with example embodiments of the present invention. For example, the memory could be configured to buffer input data for processing by the processor 44. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 44 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 46 or otherwise accessible to the processor. As such, whether configured by hardware or by a combination of hardware and software, the processor may represent an entity (e.g., physically embodied in circuitry—in the form of processing circuitry 42) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 5:
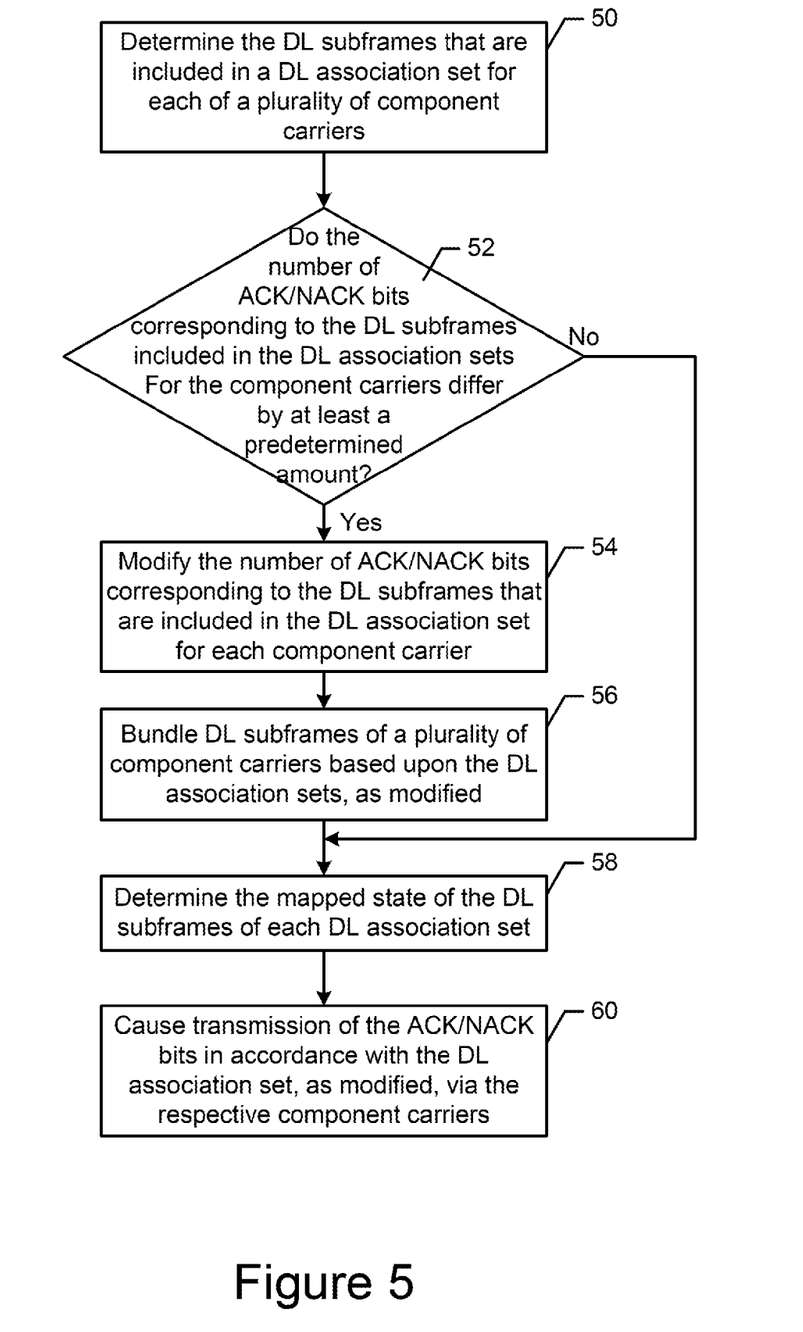
FIG. 5 is a flowchart illustrating operations performed in the context of a mobile terminal in accordance with one embodiment of the present invention.
Figure 6:
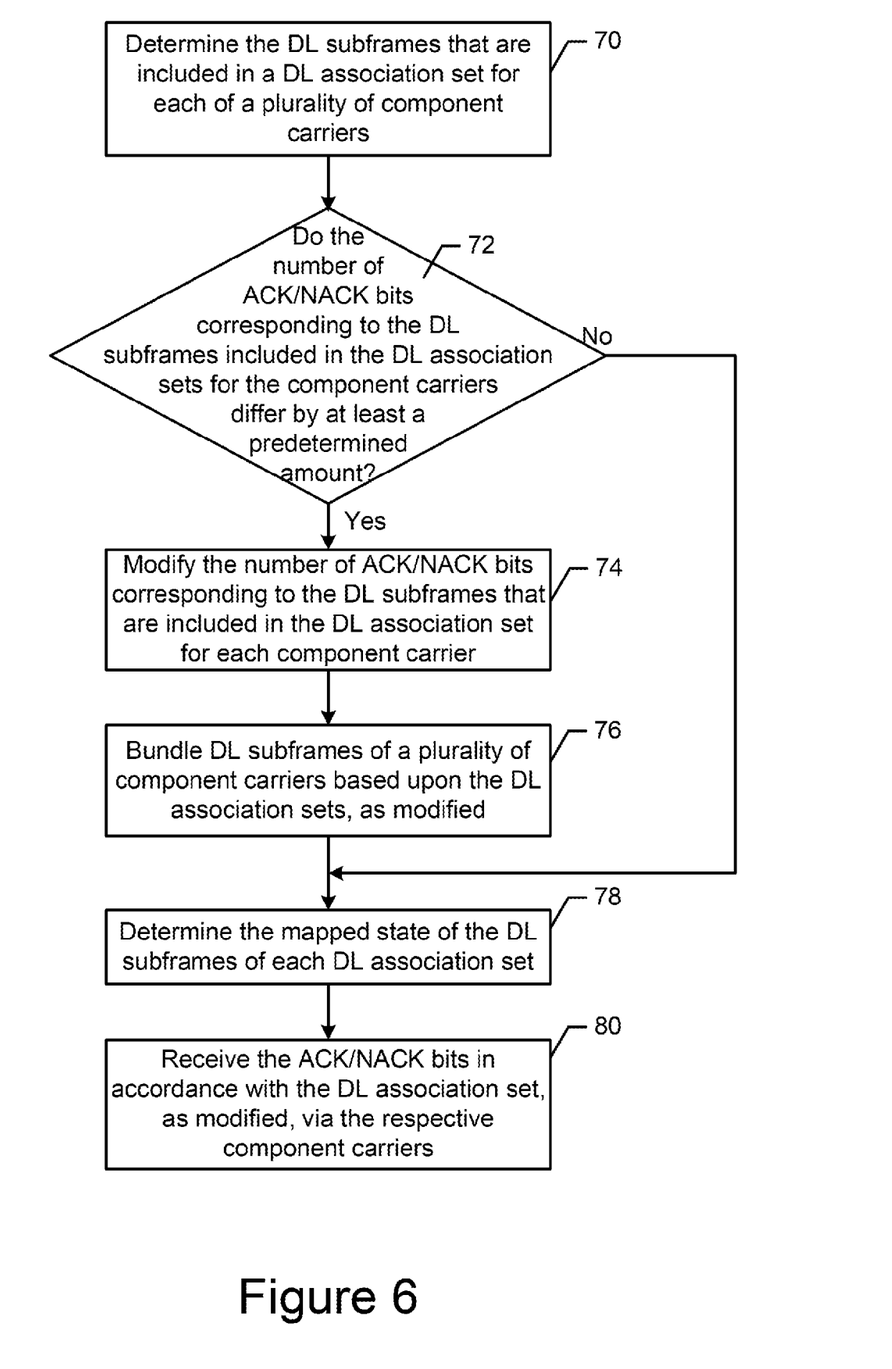
FIG. 6 is a flowchart illustrating operations performed in the context of a base station or other network entity in accordance with one embodiment of the present invention.

Referring now to FIGS. 5 and 6, flowcharts illustrating the operations performed by a method, apparatus and computer program product, such as apparatus 20 of FIG. 3 in regards to FIG. 5 and apparatus 40 of FIG. 4 in regards to FIG. 6, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 5 and 6, when executed, convert a computer or processing circuitry into a particular machine configured to perform an example embodiment of the present invention. Accordingly, the operations of each of FIGS. 5 and 6 define an algorithm for configuring a computer or processing circuitry, e.g., processor 24, to perform an example embodiment. In some cases, a general purpose computer may be provided with an instance of the processor which performs the algorithm of a respective one of FIGS. 5 and 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

As shown in block 50 of FIG. 5 from the context of a mobile terminal 10, an apparatus 20 according to one embodiment of the present invention includes means, such as the processing circuitry 22, the processor 24, the device interface 28 or the like, for determining the DL subframes, such as the number of DL subframes, that are included in a DL association set for each of a plurality of component carriers. In this regard, a DL association set includes all of the DL subframes on a respective component carrier that need UL ACK/NACK feedback in a respective UL subframe. By way of an example, the component carriers may include a primary cell and a secondary cell having respective DL association sets with N1 DL subframes and N2 DL subframes, respectively, in this regard, the number of DL subframes in a DL association set for a component carrier having a predefined configuration may be based upon the LTE release 8/9/10 UL ACK/NACK timing specifications. As shown in block 52, the apparatus of this embodiment may also include means, such as the processing circuitry, the processor or the like, for determining whether the number of ACK/NACK bits corresponding to the DL subframes in the DL association sets for the component carriers differ by at least a predetermined amount. A DL subframe may include one ACK/NACK bit or, in some embodiments, more than one ACK/NACK bit. Thus, the determination as to the number of ACK/NACK bits corresponding to the DL subframes in the DL association sets may, in one embodiment in which each DL subframe includes a single ACK/NACK bit, also determine the number of DL subframes in the DL association sets for the component carriers. While different predetermined amounts may be established in various embodiments, the processor of one embodiment is configured to determine whether the number of ACK/NACK bits corresponding to the DL subframes in the DL association sets for the component carriers differ by more than one. For example, in one embodiment in which each DL subframe includes a single ACK/NACK bit and N1 and N2 represent the number of DL subframes in the DL association sets for the primary cell and a secondary cell, respectively, the processor may determine that the difference between N1 and N2 is less than or equal to one, that is, $N1-N2 \leqq 1$, such that the number of DL subframes in the DL association sets for the component carriers is not changed, but is, instead, allowed to remain the same. Alternatively, in an instance in which the DL subframes in the DL association sets for the component carriers are determined to differ by at least a predetermined amount, such as by more than one, that is, N1−N2>1, the apparatus may include means, such as the processing circuitry, the processor or the like, for modifying the number of ACK/NACK bits corresponding to the DL subframes that are included in the DL association set for each component carrier so as to at least partially remedy the imbalance. See block 54 of FIG. 5.

The number of ACK/NACK bits corresponding to the DL subframes that are included in the DL association sets may be modified in various manners. In one embodiment, the number of DL subframes in the DL association set for one component carrier, that is, the component carrier having the DL association set with fewer DL subframes, may be increased while the number of DL subframes in the DL association set for another component carrier, that is, the component carrier having a DL association set with more DL subframnes, may be decreased. In this regard, the number of DL subframnes in the DL association set for one component carrier may be increased by the same number of DL subframes that the number of DL subframes in the DL association set for the other component carrier is decreased. In this embodiment, the number of DL subframes in the DL association set for one component carrier may be increased and the number of DL subframes in the DL association set for the other component carrier may be correspondingly decreased until the number of DL subframes in the DL association sets for the respective component carriers differ by less than the predetermined amount, such as differing by no more than one.

As shown in block 56, the apparatus 20 of one embodiment may also include means, such as the processing circuitry 22, the processor 24 or the like, for bundling the DL subframes of the component carriers based upon the DL association sets, as modified. With reference to FIG. 1 in which a primary cell has a TDD configuration #4 and a secondary cell has a TDD configuration #1, the primary cell may initially have four DL subframes in its DL association set (as a result of DL subframes #6, #7, #8 and #9 requiring UL ACK/NACK in DL subframe #3) and the secondary cell may initially have one DL subframe in its DL association set (as a result of DL subframe #9 requiring UL ACK/NACK in DL subframe #3. Without modification, the four DL subframes in the DL association set of the primary cell would be bundled, while the one DL subframe in the DL association set of the secondary set would be bundled. As a result of the unbalanced nature of the bundled UL subframes, performance loss will result. In accordance with an embodiment of the present invention, however, following the modification of the number of DL subframes in the DL association sets of the component carriers, the DL subframes may be bundled in accordance with the resulting DL association sets. In accordance with the example of FIG. 1, the primary cell may have three DL subframes in its DL association set and the secondary cell may have two DL subframes in its DL association set. As such, the three DL subframes in the DL association set of the primary cell may be bundled. For example, subframes #6, #7 and #8 of the primary cell may be bundled. Additionally, the two DL subframes in the DL association set of the secondary cell may be bundled. For example, subframe #9 of the secondary cell and subframe #9 of the primary cell may be bundled. Thus, DL subframes may be bundled in accordance with one embodiment even though the DL subframes are in different component carriers.

Component carriers having more than a predetermined number of DL subframes in its DL association set, such as component carriers having more than two DL subframes in its DL association set, may be configured to have the DL subframes compressed, such as in accordance with a predefined mapping. As shown in block 58, the apparatus 20 of one embodiment may include means, such as the processing circuitry 22, the processor 24 or the like, for determining the mapped states of the DL subframes of the DL association set for each respective carrier. The mapping may depend, for example, upon the number of DL subframes in a DL, association set. In this regard, Tables 2 and 3 are provided below to show examples of the mapping of three DL subframes in a DL association set to corresponding states for each component carrier in Table 2 and from four DL subframes in a DL association set to corresponding states for each component carrier in Table 3.

TABLE 2

| HARQ-ACK(0), HARQ-ACK(1), HARQ-ACK(2) | Mapped state |
|---|---|
| ACK, ACK, ACK | ACK, ACK |
| ACK, ACK, NACK/DTX | NACK/DTX, ACK |
| ACK, NACK/DTX, any | ACK, NACK/DTX |
| NACK/DTX, any, any | NACK/DTX, NACK/DTX |

TABLE 3

| HARQ-ACK(0), HARQ-ACK(1), HARQ-ACK(2), HARQ-ACK(3) | Mapped state |
|---|---|
| 'D, any, any, any' or no DL assignment is received. | D, D |
| 'A, D, D, D' | A, N |
| 'A, A, N/D, any' | N, A |
| 'A, A, A, N/D' | A, A |
| 'A, A, A, A' | A, N |
| 'N, any, any, any' or 'A, D/N, any, any except for A, D, D, D' | N, N |

In one embodiment, there need not be any mapping in an instance in which the number DL subframes in a DL association set is two or less. However, in instances in which there are 3, 4 or more DL subframes in a DL association set, the DL subframes in a DL, association set may be mapped to corresponding states, such as in accordance with the above example tables. Based upon the mapped states of the DL association set for each respective component carrier and as shown in block 60 of FIG. 5, the apparatus 20 may also include means, such as the processing circuitry 22, the processor 24, the device interface 28 or the like, for causing transmission of the ACK/NACK bits in accordance with the DL association set, as modified, via the respective component carriers.

With reference to the foregoing example in which three DL subframes, e.g., subframes #6, #7 and #8, that require an UL ACK bit in UL subframe #3 are bundled in accordance with the DL association set of the primary cell, the three DL subframes may be mapped to "ACK, ACK." pursuant to Table 2. Additionally, the two DL subframes, e.g., subframe #9 of the secondary cell and subframe #9 of the primary cell, that are bundled in accordance with the DL association set of the secondary cell need not be mapped and may retain their initial values, such as "ACK, NACK". To complete this example, the apparatus 20, such as the processor 24, may determine a PUCCH channel on UL subframe #3 based on the determined states, e.g., ACK, ACK, ACK, NACK, so as to provide the UL ACK/NACK.

As shown in FIG. 6 from the perspective of a base station 14, an apparatus 40 is configured to perform similar operations to those described above in conjunction with the apparatus 20 of the mobile terminal 10 in order to determine the manner in which the DL subframes of the DL association sets should be received for the respective component carriers. In this regard, the apparatus may include means, such as the processing circuitry 42, the processor 44, the device interface 48 or the like, for determining the DL subframes, such as the number of DL subframes, that are included in a DL association set for each of a plurality of component carriers, as shown in block 70) of FIG. 6 and as described above in conjunction with block 50 of FIG. 5. As shown in block 72, the apparatus of this embodiment may also include means, such as the processing circuitry, the processor or the like, for determining whether the number of ACK/NACK bits corresponding to the DL subframes included in the DL association sets for the component carriers differ by at least a predetermined amount, such as by 1. In one embodiment in which the number of ACK/NACK bits corresponding to the DL subframes in the DL association sets for the primary cell and a secondary cell differ, if at all, by less than the predetermined amount, the number of DL subframes in the DL association sets for the component carriers is not changed, but is, instead, allowed to remain the same. Alternatively, in an instance in which the ACK/NACK bits corresponding to the DL subframes in the DL association sets for the component carriers are determined to differ by at least a predetermined amount, such as by more than one, the apparatus may include means, such as the processing circuitry, the processor or the like, for modifying the number of ACK/NACK bits corresponding to the DL subframes that are included in the DL association set for each component carrier so as to at least partially remedy the imbalance. See block 74 of FIG. 6 with examples of the modification of the number of DL subframes in the DL association sets described above in conjunction with block 54 of FIG. 5.

As shown in block 76 and as described above in conjunction with block 56 of FIG. 5, the apparatus 40 of one embodiment may also include means, such as the processing circuitry 42, the processor 44 or the like, for bundling the DL subframes of the component carriers based upon the DL association sets, as modified. As described in the context of a mobile terminal 10, component carriers having more than a predetermined number of DL subframes in the DL association set, such as component carriers having more than two DL subframes in the DL association set, may be configured to have the DL subframes in the DL association set compressed, such as in accordance with a predefined mapping. As shown in block 78, the apparatus of one embodiment may include means, such as the processing circuitry, the processor or the like, for determining the mapped states of the DL subframes of each DL association set. The mapping may depend, for example, upon the number of DL subframes in the DL association sets, such as shown above in Tables 2 and 3.

As noted above, there need not be any mapping in an instance in which the number DL subframes in a DL association set is two or less. However, in instances in which there are 3, 4 or more DL subframes in the DL association set, the DL subframes of the DL association set may be mapped to a corresponding state. Based upon the mapped states of the DL subframes in the DL association sets for each respective component carrier and as shown in block 80 of FIG. 5, the apparatus 40 may also include means, such as the processing circuitry 42, the processor 44, the device interface 48 or the like, for receiving the ACK/NACK, bits in accordance with the DL association set, as modified, via the respective component carriers.

By modifying the number of ACK/NACK bits corresponding to the DL subframes in the DL association sets for the respective component carriers, the TP loss due to unnecessary retransmissions may be advantageously reduced. For example, the numbers of DL subframes in the DL association sets for first and second component carriers designated N1 and N2, respectively, may, for example, have ratios of N1:N2 of 4:1, 4:2 and 3:1 which may be modified in accordance with embodiments of the present invention so as to be 3:2, 3:3 and 2:2. In instances in which the N1:N2 ratios of 4:1 and 3:1 are modified to ratios of 3:2 and 2:2, less bundling is required by the first component carrier so as to result in less TP loss while the performance of the second component carrier is not compromised.

In an instance in which the TDD UL/DL configuration for one of the component carriers is reconfigured by the base station 14, there may be a time period during which the base station and mobile terminal 10 have different understandings of the TDD configuration of the component carrier. During the time period in which this different understanding or ambiguity exists, it may be difficult to map the DL subframes of DL association set to corresponding states, such as shown above in Tables 2 and 3 since the size of the DL association set may be uncertain. In this instance, the base station may avoid any PDSCH scheduling during the period of ambiguity so that the mobile terminal will not report any ACK/N ACK during this time period.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
    determining downlink (DL) subframes that are included in a DL association set for each of a plurality of component carriers;
    in an instance in which a number of acknowledgement (ACK)/negative acknowledgement (NACK) bits corresponding to the DL subframes included in the DL association sets for respective component carriers differ by at least a predetermined amount, modifying the number of ACK/NACK bits corresponding to the DL subframes that are included in the DL association set for each of the respective component carriers; and
    causing transmission of ACK/NACK bits in accordance with the DL association set, as modified, via the respective component carriers.

2. The method according to claim 1, wherein modifying the number of ACK/NACK bits corresponding to the DL subframes that are included in the DL association set comprises increasing the number of DL subframes that are included in the DL association set for one component carrier and decreasing the number of DL subframes that are included in the DL association set for another component carrier until the number of DL subframes that are included in the DL association sets for respective component carriers differ by less than the predetermined amount.

3. The method according to claim 2, wherein increasing and decreasing the number of DL subframes that are included in the DL association sets for the respective component carriers comprise increasing and decreasing the number of DL subframes that are included in the DL association sets for the respective component carriers by equal amounts.

4. The method according to claim 1, further comprising bundling DL subframes of a plurality of component carriers based upon the DL association sets, as modified.

5. The method according to claim 1, further comprising determining a mapped state of the DL sub-frames of each respective DL association set.

6. An apparatus comprising:
at least one processor; and
at least one memory including computer program code, wherein the at least one memory and the computer program code are configured to, with the at least one processor, cause the apparatus at least to perform:
determining downlink (DL) subframes that are included in a DL association set for each of a plurality of component carriers;
in an instance in which a number of acknowledgement (ACK)/negative acknowledgement (NACK) bits corresponding to the DL subframes included in the DL association sets for respective component carriers differ by at least a predetermined amount, modifying the number of ACK/NACK bits corresponding to the DL subframes that are included in the DL association set for each of the respective component carriers; and
causing transmission of ACK/NACK bits in accordance with the DL association set, as modified, via the respective component carriers.

7. The apparatus according to claim 6, wherein the at least one memory and the computer program code are configured to, with the at least one processor, cause the apparatus to modify the number of ACK/NACK bits corresponding to the DL subframes that are included in the DL association set by increasing the number of DL subframes that are included in the DL association set for one component carrier and decreasing the number of DL subframes that are included in the DL association set for another component carrier until the number of DL subframes that are included in the DL association sets for respective component carriers differ by less than the predetermined amount.

8. The apparatus according to claim 7, wherein the at least one memory and the computer program code are configured to, with the at least one processor, cause the apparatus to increase and decrease the number of DL subframes that are included in the DL association sets for the respective component carriers by increasing and decreasing the number of DL subframes that are included in the DL association sets for the respective component carriers by equal amounts.

9. The apparatus according to claim 6, wherein the at least one memory and the computer program code are further configured to, with the at least one processor, cause the apparatus to bundle DL subframes of a plurality of component carriers based upon the DL association sets, as modified.

10. The apparatus according to claim 6, wherein the at least one memory and the computer program code are further configured to, with the at least one processor, cause the apparatus to determine a mapped state of the DL subframes of each respective DL association set.

11. The apparatus according to claim 6, wherein the apparatus comprises a mobile terminal.

12. The apparatus according to claim 11, further comprising a device interface configured to communicate with a base station including transmission of ACK/NACK bits in accordance with the DL association set, as modified, via the respective component carriers.

13. The apparatus according to claim 6, wherein the processor is configured for use in a Long Term Evolution (LTE) system.

14. A method comprising:
determining downlink (DL) subframes that are included in a DL association set for each of a plurality of component carriers;
in an instance in which a number of acknowledgement (ACK)/negative acknowledgement (NACK) bits corresponding to the DL subframes included in the DL association sets for respective component carriers differ by at least a predetermined amount, modifying the number of ACK/NACK bits corresponding to the DL subframes that are included in the DL association set for each of the respective component carriers; and
receiving signals via the respective component carriers including ACK/NACK bits in accordance with the DL association set, as modified.

15. The method according to claim 14, wherein modifying the number of ACK/NACK bits corresponding to the DL subframes that are included in the DL association set comprises increasing the number of DL subframes that are included in the DL association set for one component carrier and decreasing the number of DL subframes that are included in the DL association set for another component carrier until the number of DL subframes that are included in the DL association sets for respective component carriers differ by less than the predetermined amount.

16. The method according to claim 15, wherein increasing and decreasing the number of DL subframes that are included in the DL association sets for the respective component carriers comprise increasing and decreasing the number of DL subframes that are included in the DL association sets for the respective component carriers by equal amounts.

17. The method according to claim 14, further comprising bundling DL subframes of a plurality of component carriers based upon the DL association sets, as modified.

18. The method according to claim 14, further comprising determining a mapped state of the DL subframes of each respective DL association set.

19. An apparatus comprising:
at least one processor; and
at least one memory including computer program code, wherein the at least one memory and the computer program code are configured to, with the at least one processor, cause the apparatus at least to perform:
determining downlink (DL) subframes that are included in a DL association set for each of a plurality of component carriers;
in an instance in which a number of acknowledgement (ACK)/negative acknowledgement (NACK) bits corresponding to the DL subframes included in the DL association sets for respective component carriers differ by at least a predetermined amount, modifying the number of ACK/NACK bits corresponding to the DL subframes that are included in the DL association set for each of the respective component carriers; and
receiving signals via the respective component carriers including ACK/NACK bits in accordance with the DL association set, as modified.

20. The apparatus according to claim 19, wherein the at least one memory and the computer program code are configured to, with the at least one processor, cause the apparatus to modify the number of ACK/NACK bits corresponding to the DL subframes that are included in the DL association set by increasing the number of DL subframes that are included in the DL association set for one component carrier and decreasing the number of DL subframes that are included in the DL association set for another component carrier until the number of DL subframes that are included in the DL association sets for respective component carriers differ by less than the predetermined amount.

22. The apparatus according to claim 20, wherein the at least one memory and the computer program code are configured to, with the at least one processor, cause the apparatus to increase and decrease the number of DL subframes that are included in the DL association sets for the respective component carriers by increasing and decreasing the number of DL subframes that are included in the DL association sets for the respective component carriers by equal amounts.

22. The apparatus according to claim 19, wherein the at least one memory and the computer program code are further configured to, with the at least one processor, cause the apparatus to bundle DL subframes of a plurality of component carriers based upon the DL association sets, as modified.

23. The apparatus according to claim 19, wherein the at least one memory and the computer program code are further configured to, with the at least one processor, cause the apparatus to determine a mapped state of the DL subframes of each respective DL association set.

24. The apparatus according to claim 19, wherein the apparatus comprises a base station.

25. The apparatus according to claim 23, further comprising a device interface configured to communicate with a mobile terminal including receipt of ACK/NACK bits in accordance with the DL association set, as modified, via the respective component carriers.

26. The apparatus according to claim 19, wherein the processor is configured for use in a Long Term Evolution (LTE) system.

* * * * *